No. 885,671. PATENTED APR. 21, 1908.
W. B. EASON.
TRAP.
APPLICATION FILED SEPT. 11, 1907.

3 SHEETS—SHEET 1.

Witnesses
F. C. Gibson.
C. C. Hines.

Inventor
William B. Eason.
By Victor J. Evans
Attorney

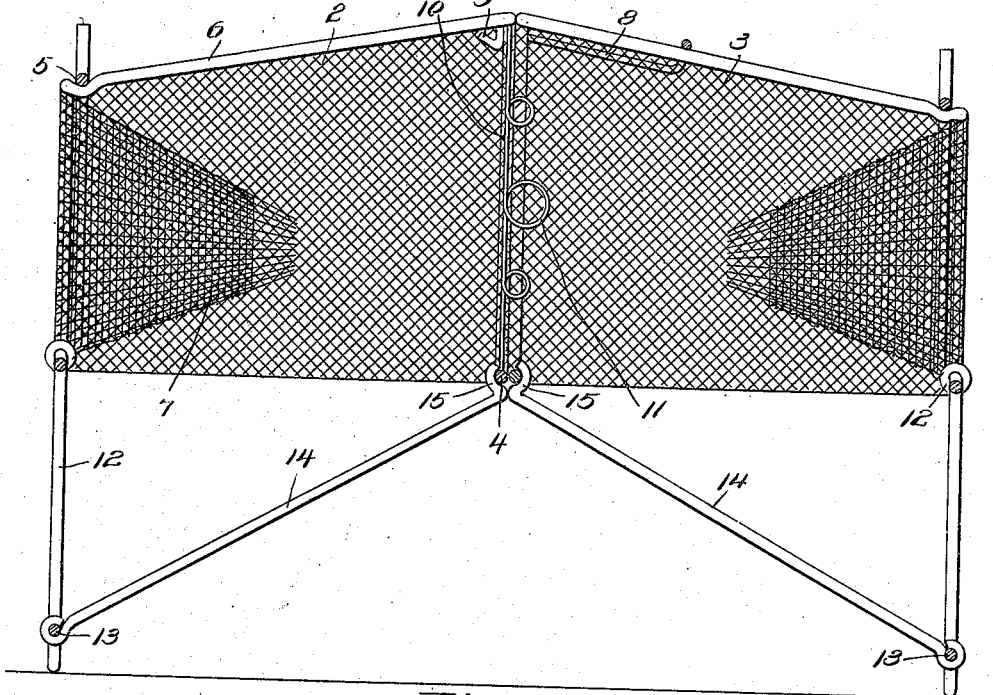
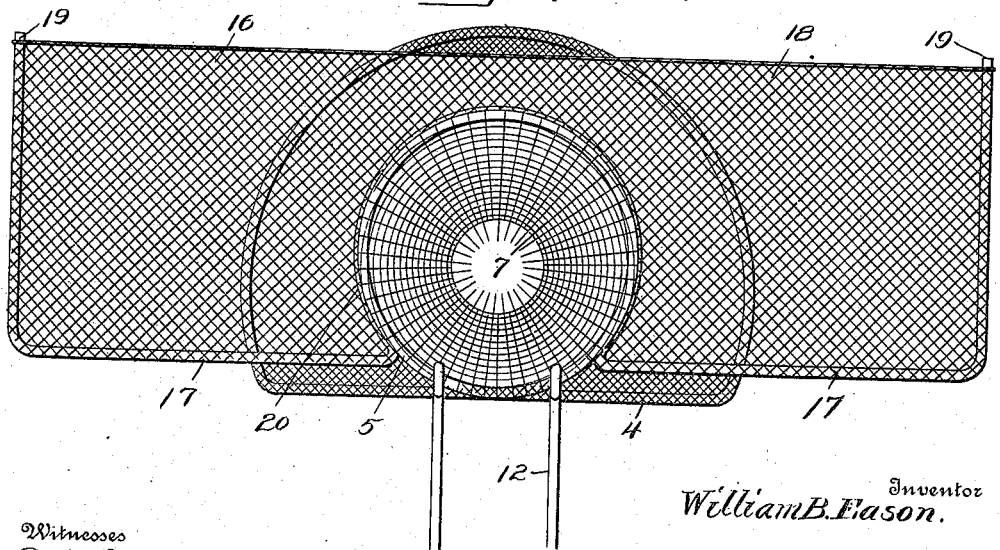

No. 885,671. PATENTED APR. 21, 1908.
W. B. EASON.
TRAP.
APPLICATION FILED SEPT. 11, 1907.

3 SHEETS—SHEET 3.

Witnesses
F. C. Gibson.
C. C. Hines.

Inventor
W. B. Eason.
By Victor J. Evans
Attorney

UNITED STATES PATENT OFFICE.

WILLIAM B. EASON, OF ERA, ARKANSAS.

TRAP.

No. 885,671.　　　　Specification of Letters Patent.　　　Patented April 21, 1908.

Application filed September 11, 1907. Serial No. 392,347.

*To all whom it may concern:*

Be it known that I, WILLIAM B. EASON, a citizen of the United States, residing at Era, in the county of Miller and State of Arkansas, have invented new and useful Improvements in Traps, of which the following is a specification.

This invention relates to traps, the main object of the invention being to provide a simple construction of trap which, while designed primarily for use in catching fish, may also be employed on land for catching birds and animals, and which is so constructed as to be readily collapsed for storage or transportation in close compass.

Another object of the invention is to provide a trap which is adapted to rest directly upon the ground or bed of the stream or to be supported at an elevation above the same, and which is provided with improved supporting means for holding it in an elevated position, and with detachable wing-frames acting as leaders to guide the fish thereto.

The invention consists of the features of construction, combination and arrangement of parts hereinafter fully described and claimed, reference being had to the accompanying drawings, in which:—

Figure 1:
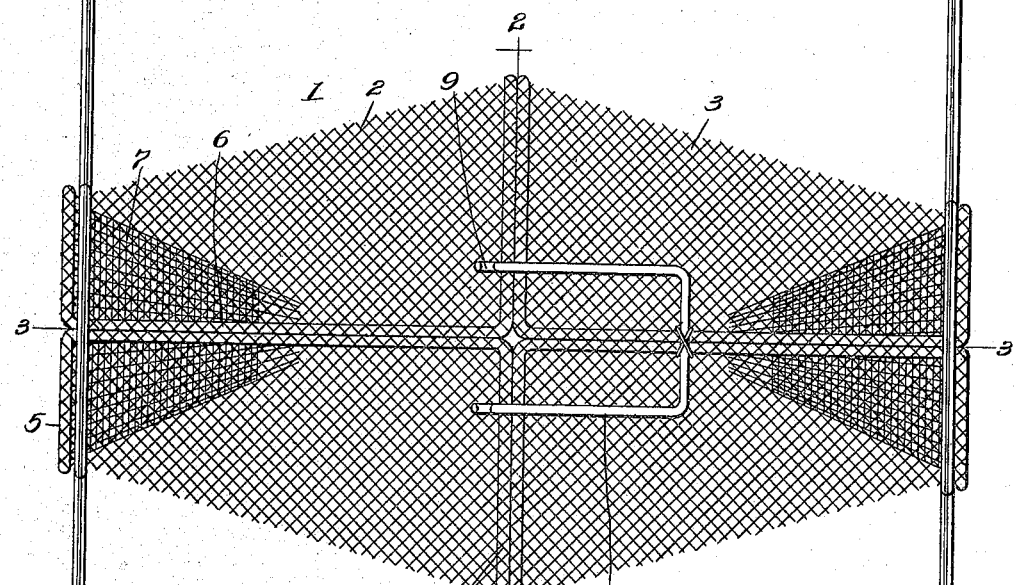
Figure 2:
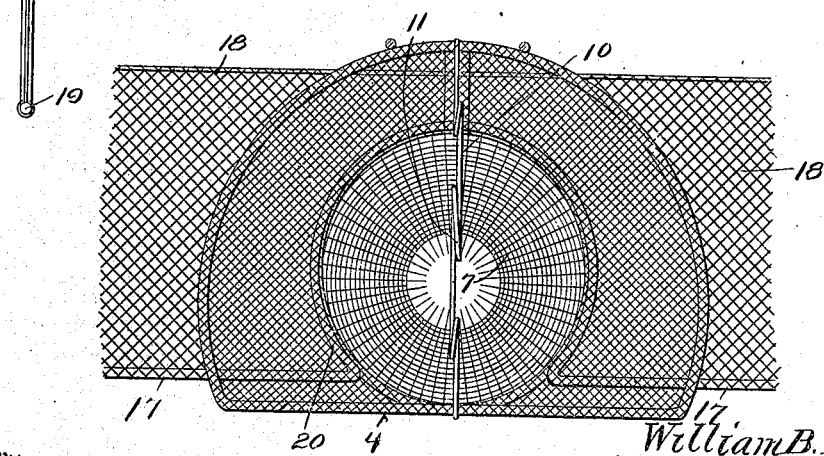
Figure 5:
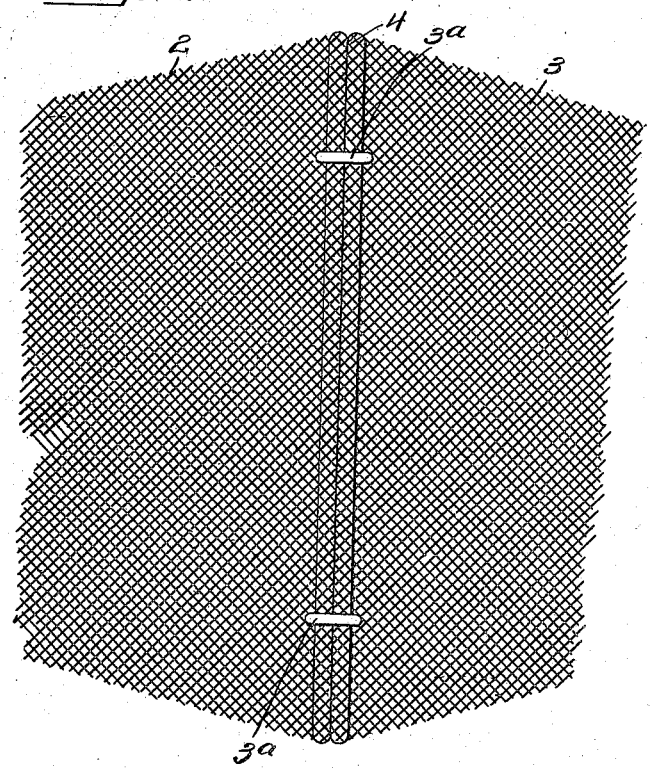
Figure 6:
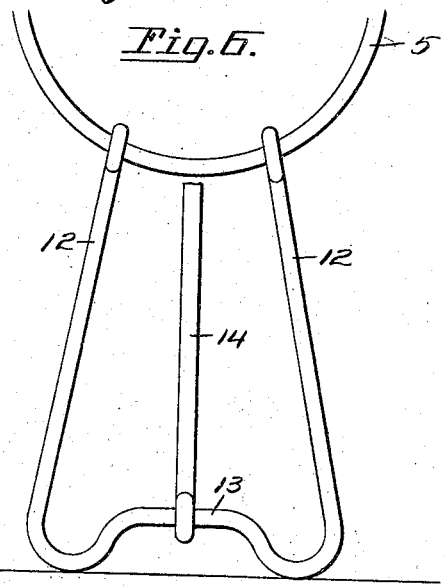

Figure 1 is a top plan view of the trap as set up for use. Fig. 2 is a transverse section thereof on line 2—2 of Fig. 1. Fig. 3 is a longitudinal section on line 3—3 of Fig. 1. Fig. 4 is an end elevation of the trap. Fig. 5 is a fragmentary bottom plan view showing the pivotal connections between the trap sections. Fig. 6 is a detail view of one of the pivoted legs.

Referring to the drawings, 1 designates the body of the trap composed of complemental sections 2 and 3, each preferably formed of a wire frame embodying terminal rings 4 and 5 and connecting longitudinal arms 6, together with a covering of wire or other suitable mesh material. The sections are generally of frusto-conical form with their bases arranged in apposition, the base of each section being, however, flattened to provide a flat bottom for the body to permit the same to rest squarely upon the ground or bed of the stream or be inserted under logs and other obstructions.

The flattened base portions of the body sections 2 and 3 are detachably hinged or pivoted as at 3ᵃ in any preferred manner, so that the trap may be opened or closed by swinging the sections on their pivotal connection for the application of the base and removal of the entrapped fish. Each section is provided with a funnel-shaped entrance 7 supported by and extending inwardly from the outer terminal frame-rings 5, and in order to hold the trap sections closed a latch device 8 is employed. This preferably comprises a bail-shaped piece of wire connected at its bight portion to one of the sections and formed at the free ends of its arms with hooks 9 to pass through the meshes of the other section and engage the frame-ring 4 thereof, whereby the sections will be held securely closed. The catch is arranged preferably at the top of the trap and may be pivotally connected by a tie to the upper longitudinal arms 6 of the section to which it is applied. The inner frame-ring 4 of one of the sections carries a bait holder, preferably in the form of a wire 10 attached at its extremities to the top and bottom portions thereof. This wire may be provided with loops 11 to hold the bait.

In order to support the trap body in an elevated position, folding legs 12 are provided upon the outer end of the sections 2 and 3. These legs are preferably formed of wire and of bail-form with the free ends of the arms thereof pivotally connected with the outer frame rings 5 and with the central portions of their cross-pieces connecting the lower ends of the arms bent up centrally to provide cranks or loops 13 to which are pivotally connected the outer ends of wire braces 14. The legs are adapted to fold against the under side of the trap with the braces to permit the trap to seat squarely upon its bottom and may be extended to a vertical position as shown in Fig. 3 to hold the trap elevated. When so extended the braces 14 are brought to extend at an inward and upward angle and are connected at their free ends with the trap body to stay the legs. The free ends of the braces may be hooked into the meshes of the body to hold the legs extended, but are preferably provided with hooks 15 to engage the flattened bottom portions of the frame-ring 4.

Wing-frames 16 of oblong rectangular form are provided for use at the ends of the trap to form leaders or wings extending laterally in each direction from the outer end or mouth of each entrance-way to guide the fish toward the latter. The ends of these wing-frames may extend straight outward from the sides of the trap or be bent to lie at any suitable angle, as circumstances may require. These attachments are each formed of a three-sided frame consisting of a single length of wire 17 bent upwardly at right angles at its end and an oblong rectangular piece of woven wire of mesh material 18 secured at its lower edge to the body of the frame wire 17 and at its end edges to the upright end portions 19 thereof. The central portion of the body of the wire 17 is bent upwardly into partially circular form to provide a spring-clamp 20 adapted to inclose and grip the reduced end of either trap section to detachably secure the wing-frame thereto. This construction allows the wing-frame to be readily applied and removed, as will be readily understood.

It will be understood, of course, that when the legs and braces are folded the trap body sections 2 and 3 may be swung open to a substantially parallel position for storage or packing or disconnected and packed one within the other, by inserting the reduced end of one within the large end of the other, in an obvious manner. The trap may also be used for catching small fish or minnows for use as live bait, if desired.

Having thus described the invention, what I claim is:—

1. A trap comprising a body formed of two hinged sections, each having an entrance at its outer end, a fastening for connecting the hinged ends of the sections, folding legs pivoted to the outer ends of the sections, and braces for holding the same in extended position.

2. A trap comprising a body formed of two sections pivotally connected at their inner ends and having inwardly extending tapering entrances at their outer ends, a latch device for holding the sections closed, pivoted legs at the outer ends of the sections, and braces for connecting the extended legs with the closed body.

3. A trap comprising a body formed of two hinged sections, said sections being provided at their outer ends with entrances, a fastening for holding the sections closed, legs pivotally mounted upon the ends of the sections to fold against the underside thereof, and braces pivotally connected with the legs and having hooked portions to engage the hinged ends of the sections, whereby the legs may be held extended.

4. A trap comprising a body composed of two hinged sections, means for holding the sections closed, inwardly extending entrances at the outer ends of the sections, and wings supported on the outer ends of the sections, said wings having clasps to detachably engage said sections.

5. A trap comprising a body having entrances at its opposite ends, and detachable wing-sections adapted to be applied to the ends of the body, each section having a frame formed of wire bent to provide a spring clasp to partially surround and engage the end of the body.

6. A trap comprising a trap body formed of two pivoted sections having entrances at its opposite ends, means for holding the sections closed, pivoted legs at the ends of the body, and braces for staying the extended legs from the body.

In testimony whereof I affix my signature in presence of two witnesses.

WILLIAM B. EASON.

Witnesses:
H. FINCHER EASON,
I. N. THOMAS.